(12) United States Patent
Cipollini

(10) Patent No.: US 7,718,302 B2
(45) Date of Patent: May 18, 2010

(54) ELECTROCHEMICAL DEOXYGENATION OF FUEL BY ELECTROLYSIS

(75) Inventor: Ned E. Cipollini, Enfield, CT (US)

(73) Assignee: United Technologies Corporation, Hartford, CT (US)

( * ) Notice: Subject to any disclaimer, the term of this patent is extended or adjusted under 35 U.S.C. 154(b) by 729 days.

(21) Appl. No.: 11/581,300

(22) Filed: Oct. 16, 2006

(65) Prior Publication Data
US 2008/0090119 A1    Apr. 17, 2008

(51) Int. Cl.
*H01M 2/14* (2006.01)
(52) U.S. Cl. .............................. 429/39; 429/34; 429/38; 429/19; 429/22; 429/26; 429/13; 204/252; 204/253; 204/257; 204/258
(58) Field of Classification Search .................... 429/13, 429/19, 22, 26, 32, 34, 38, 39; 204/252, 204/253, 257, 258
See application file for complete search history.

(56) References Cited

U.S. PATENT DOCUMENTS

| | | | |
|---|---|---|---|
| 3,446,673 A | 5/1969 | Manion | |
| 4,527,626 A | 7/1985 | Cantu et al. | |
| 4,769,297 A * | 9/1988 | Reiser et al. | 429/17 |
| 4,830,721 A | 5/1989 | Bianchi et al. | |
| 5,122,239 A * | 6/1992 | McElroy et al. | 205/633 |
| 6,315,815 B1 | 11/2001 | Spadaccini et al. | |
| 6,383,361 B1 * | 5/2002 | Moulthrop et al. | 205/628 |
| 6,709,492 B1 | 3/2004 | Spadaccini et al. | |
| 2003/0113603 A1* | 6/2003 | Highgate | 429/30 |
| 2006/0228606 A1* | 10/2006 | Fiebig et al. | 429/32 |

FOREIGN PATENT DOCUMENTS

EP    1580252    9/2005

OTHER PUBLICATIONS

European Search Report mailed Mar. 13, 2008.

* cited by examiner

*Primary Examiner*—Bruce F Bell
(74) *Attorney, Agent, or Firm*—Carlson, Gaskey & Olds

(57) ABSTRACT

A fuel stabilization device reduces the amount of dissolved oxygen within a fuel stream utilizing the combination of an electrochemical device to produce hydrogen gas and water and a catalyst that promotes the formation of water utilizing dissolved oxygen within the fuel and hydrogen gas generated by the electrochemical device.

18 Claims, 2 Drawing Sheets

ELECTROCHEMICAL DEOXYGENATION OF FUEL BY ELECTROLYSIS

BACKGROUND OF THE INVENTION

This invention generally relates to fuel deoxygenation system for removing oxygen from a jet fuel stream. More particularly, this invention relates to an electrochemical device and catalyst for removing oxygen from a fuel stream.

It is common practice to use fuel as a cooling medium for various systems onboard an aircraft. The usable cooling capacity of a particular fuel is limited by coke deposition, which is dependent on the amount of dissolved oxygen present within the fuel due to prior exposure to air. It has been determined that decreasing the amount of dissolved oxygen present within the jet fuel reduces the formation of insoluble products referred to as "coke" or "coking".

U.S. Pat. Nos. 6,315,815 and 6,709,492 assigned to Applicant, disclose devices for removing dissolved oxygen using a gas-permeable membrane disposed within the fuel system. A partial oxygen pressure differential across the permeable membranes drives oxygen from the fuel. A vacuum pump or strip gas is utilized for generating the partial oxygen pressure differential. Generation of a large pressure differential requires a robust support structure for supporting the permeable membrane and a strip gas requires a storage vessel on board the vehicle or aircraft.

Accordingly, it is desirable to design and develop a system and device with reduced weight, structure and complexity for removing oxygen from a jet fuel stream.

SUMMARY OF THE INVENTION

An example fuel delivery system includes a fuel stabilization unit having an electrochemical device that generates hydrogen gas that is then combined with oxygen within the fuel in the presence of a catalyst.

The example fuel stabilization unit includes the electrochemical device that promotes reaction of hydrogen and oxygen within the fuel to form hydrogen gas ($H_2$) and water ($H_2O$). The electrochemical device includes a first electrode, a second electrode and an electrolyte. The first electrode is a cathode attached to a negative terminal of a power source and is in physical contact or vapor contact with the fuel. In the disclosed example, the power source is a battery that provides electrical energy to the electrochemical device. The second electrode is an anode and is attached to a positive terminal of the battery. Between the first and second electrodes is the electrolyte that comprises a sulfonated-perflourinated polymer that provides the desired ionic transfer for promoting the desired reactions within the fuel chamber and physically separates the fuel from the anode.

Electric energy supplied by the battery is supplied at a voltage determined to generate both hydrogen gas and water on the first electrode and oxygen gas at the second electrode. The hydrogen gas and water mixes with the fuel and flows downstream to a catalyst. The catalyst promotes the formation of water between the hydrogen gas produced by the electrochemical device and the dissolved oxygen within the fuel according to the chemical equation $2H_2+O_2=2H_2O$. Oxygen gas generated at the second electrode is vented and kept separate from the fuel stream by the electrolyte.

The water formed from dissolved oxygen in the fuel may then be removed if necessary from the fuel stream, or simply remain in the fuel stream for applications were slightly increased water content is not of concern. The significant reduction in dissolved oxygen provides an increased thermal capacity within the fuel and an increased resistance to the promotion of autooxidative reactions and coking.

Accordingly, the example fuel stabilization unit reduces dissolved oxygen within a fuel stream utilizing the combination of an electrochemical device to produce hydrogen gas and water and a catalyst that promotes the formation of water utilizing dissolved oxygen within the fuel and hydrogen gas generated by the electrochemical device.

These and other features of the present invention can be best understood from the following specification and drawings, the following of which is a brief description.

DETAILED DESCRIPTION OF THE PREFERRED EMBODIMENT

Figure 1:
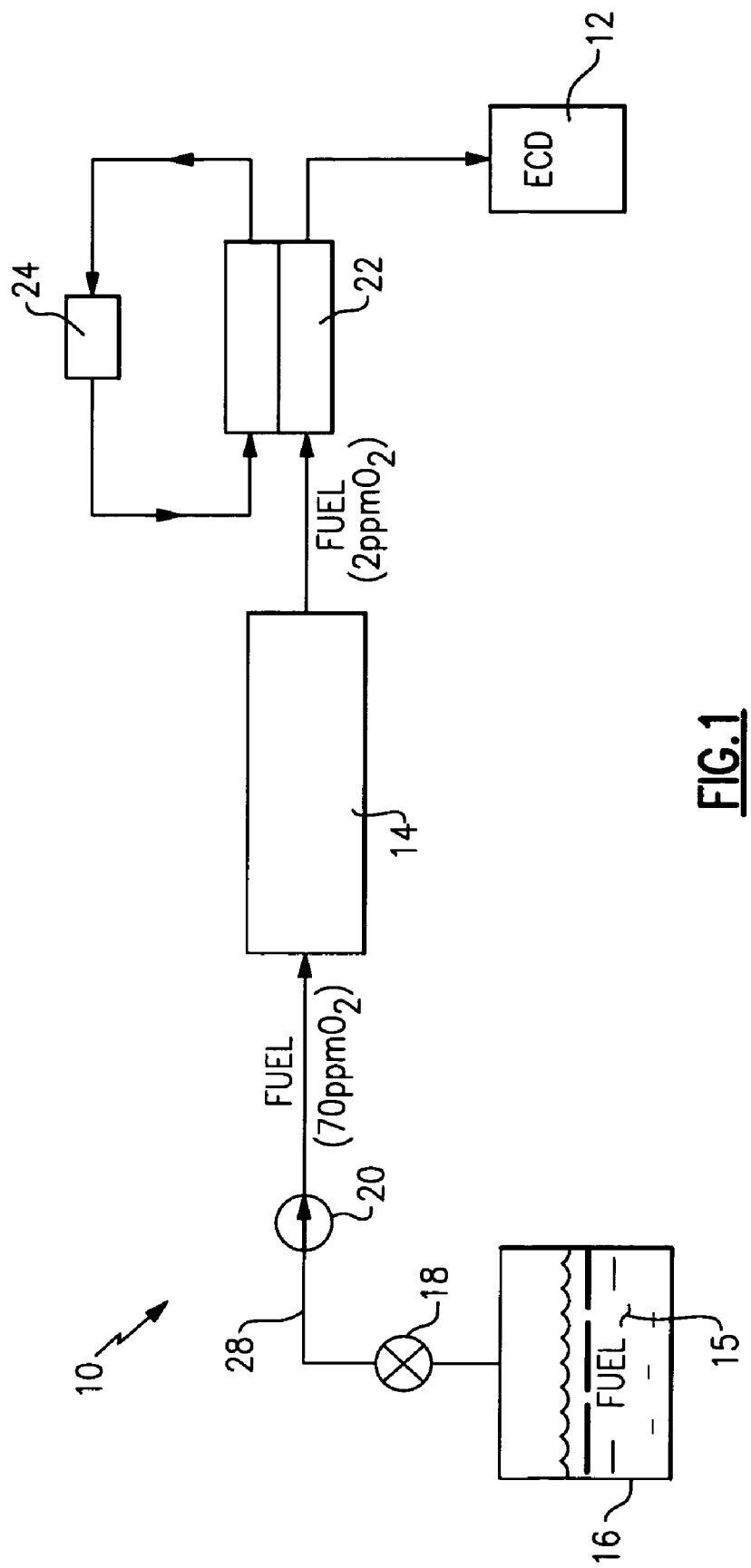
FIG. 1 is a schematic representation of an example fuel delivery system according to this invention.

Referring to FIG. 1, a fuel delivery system 10 supplies fuel to an energy conversion device (ECD) 12. Fuel 15 is stored in a reservoir 16 and is driven through a fuel line 28 by a pump 18 through fuel delivery system 10 to the ECD 12. A valve 20 controls the flow of fuel between the fuel reservoir 16 and the ECD 12. The fuel 15 is utilized as a coolant or heat sink that is flowed through a heat exchanger 22 for heat generated within another system schematically indicated at 24.

The ECD 12 may be any device that produces energy from the fuel 15 through a process such as combustion or other energy conversion process. An example ECD 12 can include a gas turbine engine that mixes the fuel with compressed air that is then ignited to generate high speed exhaust gases. The exhaust gases are then utilized to drive a turbine that in turn drives a compressor of the engine. As appreciated other system that release energy from the fuel will benefit from the disclosure of the example fuel delivery system.

Oxygen typically dissolves into the fuel 15 while stored in the reservoir 16. The dissolved oxygen promotes autooxidative reactions that can produce insoluble materials known as "coking". Coking reduces the efficiency of the fuel delivery system 10 and thereby the efficiency of the ECD 12. Typically fuel from the reservoir 16 contains approximately 70 ppm of dissolved oxygen gas ($O_2$). Reducing the amount of dissolved oxygen within the fuel inhibits the formation of autooxidative reactions to prevent coking and increase the usable heat sink capacity of the fuel 15. The example fuel delivery system 10 includes a fuel stabilization unit 14 that reduces the amount of dissolved oxygen within the fuel 15.

Figure 2:
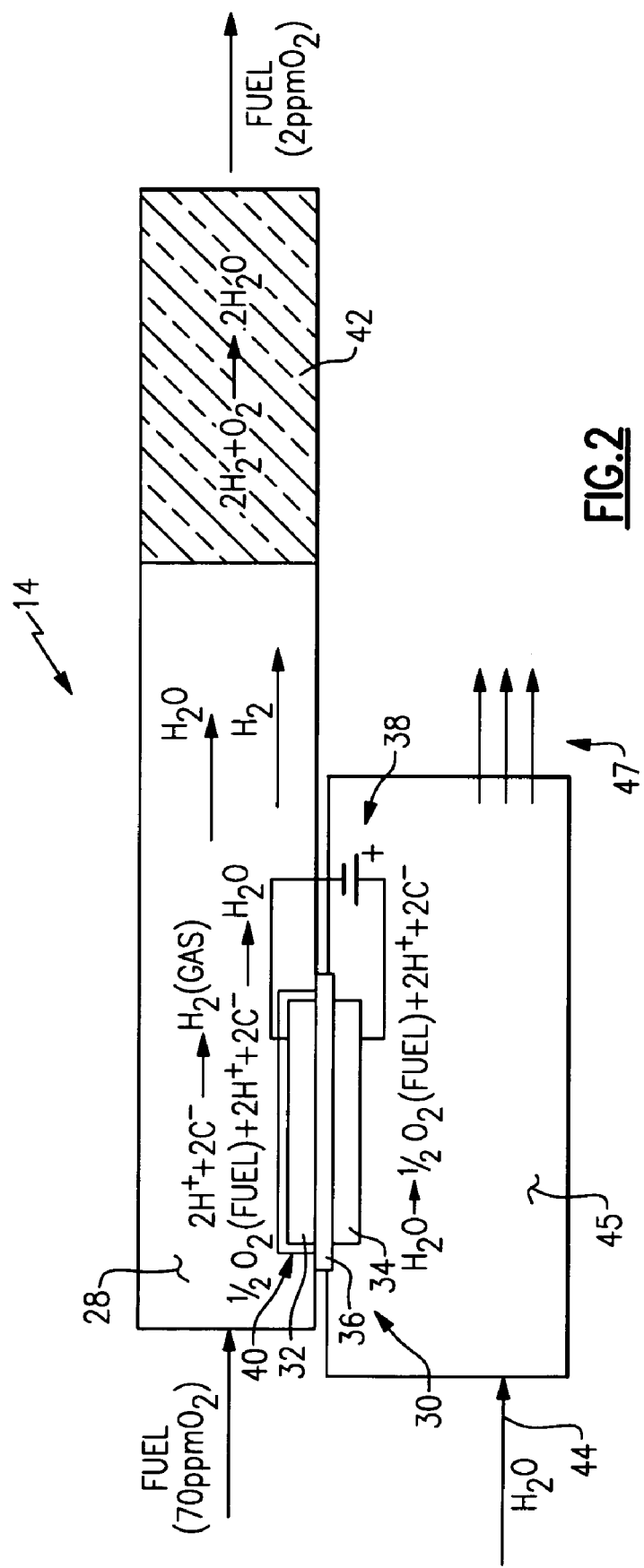
FIG. 2 is a schematic representation of an example fuel stabilization unit according to this invention.

Referring to FIG. 2, the fuel stabilization unit 14 includes an electrochemical device that promotes reaction of hydrogen and oxygen within the fuel 15 to form hydrogen gas ($H_2$) and water ($H_2O$). The electrochemical device 30 includes a first electrode 32, a second electrode 34 and an electrolyte 36. The first electrode 32 is a cathode attached to a negative terminal of a power source. In the disclosed example, the power source is a battery 38 that provide electrical energy to the electrochemical device. The second electrode is an anode and is attached to a positive terminal of the battery 38.

Between the first and second electrodes 32, 34 is the electrolyte 36 that comprises a sulfonated-perflourinated polymer that provides the desired ionic transfer for promoting the desired reactions within the fuel chamber 28 and physically separates the fuel and anode chambers. One example configuration utilizes a sulfonated perfluorinated polymer known as Nafion® 117 in membrane form approximately 175 microns thick. As appreciated other materials that provide the desired insulation and ionic transfer properties are also within the contemplation of this invention.

Electric energy supplied by the battery 38 is supplied at a voltage greater than approximately 1.2 volts. With this amount of energy, the electrochemical device 30 will generate some water and also decompose water into a hydrogen gas. The formation of water and hydrogen gas form according to the chemical equations:

$$2H^+ 2e^- \rightarrow H_2(gas) \qquad \text{equation 1}$$

$$\tfrac{1}{2}O_2(\text{fuel}) + 2H^+ + 2e^- \rightarrow H_2O \qquad \text{equation 2}$$

The hydrogen gas and water mixes with the fuel and flows downstream to a catalyst 42. The catalyst 42 comprises a material such as platinum, a platinum alloy, gold, gold-alloy, silver, silver alloy, palladium or palladium alloy, and metalloporophrins as are usually used for oxygen reduction in fuel cells, such as Cu, Ni, Fe, Co, and Mn that promotes the formation of water in the presence of hydrogen gas and dissolved oxygen. The catalyst 42 is a porous structure through which the fuel 15 flows. The catalyst promotes the formation of water between the hydrogen gas produced by the electrochemical device 30 and the dissolved oxygen within the fuel 15 according to the chemical equation:

$$2H_2 + O_2 \rightarrow 2H_2O \qquad \text{equation 3}$$

The water may then be removed if necessary from the fuel stream, or simply remain in the fuel stream for applications were slightly increased water content is not of concern in operation of the ECD 12. The resulting fuel stream includes approximately 2 ppm of dissolved oxygen. The significant reduction in dissolved oxygen provides an increased thermal capacity within the fuel and an increased resistance to the promotion of autooxidative reactions and coking.

The electrochemical device 30 operates with a flow of water 44 along the second electrode or anode 34 such that electrons and hydrogen are supplied according to the chemical reaction:

$$H_2O \rightarrow \tfrac{1}{2}O_2(\text{fuel}) + 2H^+ + 2e^- \qquad \text{equation 4}$$

The oxygen gas generated by the electrochemical reaction must be vented by a vent 47 in chamber 45. Additionally, the first electrode or cathode 32 may be coated with a barrier material 40 to prevent fouling. The example barrier material is a Teflon (AAF2400) or Hyflon (100) material. Further, other polymers such as sulfonated polysulfones, PEEKs, styrenes along with other known materials that are utilized to limit fouling of a cathode without hampering the desired reactions are also within the contemplation of this invention.

The first electrode may be removed from physical contact with the fuel and simply remain in vapor contact so that the generated hydrogen gas is injected into the fuel stream avoiding fouling of the electrode that may occur by direct contact.

Accordingly, an example fuel stabilization device according to this invention provides a substantial reduction in dissolved oxygen within a fuel stream utilizing an electrochemical device to produce hydrogen gas and water and a catalyst that promotes the formation of water utilizing dissolved oxygen within the fuel and hydrogen gas generated by the electrochemical device.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A fuel stabilization unit for conditioning a fuel stream comprising:
    an electrochemical device in contact with an oxygen containing fuel stream on a cathode side and a water stream on an anode side, wherein the electrochemical device generates hydrogen gas and water within the fuel stream on the cathode side using hydrogen provided by the water stream on the anode side and dissolved oxygen within the fuel stream; and
    a catalyst downstream of the electrochemical device for promoting the formation of water utilizing the hydrogen gas generated from the electrochemical device and dissolved oxygen within the fuel stream.

2. The fuel stabilization unit as recited in claim 1, wherein an electrolyte is disposed between the cathode and the anode.

3. The fuel stabilization unit as recited in claim 2, including a power source powering the electrochemical device.

4. The fuel stabilization unit as recited in claim 2, wherein the cathode is in direct contact with the fuel stream, and the anode is separated from the fuel stream.

5. The fuel stabilization unit as recited in claim 4, wherein the cathode is coated with a barrier material for limiting fouling.

6. The fuel stabilization unit as recited in claim 2, wherein the electrolyte comprises a polymer.

7. The fuel stabilization unit as recited in claim 2, wherein the electrolyte comprises a sulfonated-perfluorinated polymer.

8. The fuel stabilization unit as recited in claim 1, wherein the catalyst comprises a porous plug through which at least a portion of the fuel stream flows.

9. The fuel stabilization unit as recited in claim 1, wherein the catalyst comprises a surface area determined to convert hydrogen gas and oxygen into water at a rate commensurate with the flow rate of the fuel stream.

10. A method of deoxygenating a fuel stream comprising the steps of:
    a) flowing a fuel stream containing oxygen across a cathode side of an electrochemical device;
    b) flowing water along an anode side of the electrochemical device;
    b) producing hydrogen gas within the fuel stream with the electrochemical device utilizing at least some oxygen dissolved within the fuel stream and hydrogen supplied by the water flowing along the anode side of the electrochemical device; and
    c) flowing the fuel stream across a catalyst downstream of the electrochemical device, wherein the catalyst promotes the formation of water utilizing the hydrogen gas generated by the electrochemical device and oxygen dissolved within the fuel stream.

11. The method as recited in claim 10, wherein the cathode is exposed to the fuel stream, the anode is not exposed to the fuel stream and an electrolyte is disposed therebetween.

12. The method as recited in claim 11, wherein step c includes flowing the fuel stream through the catalyst.

13. The method as recited in claim 12, wherein the catalyst comprises a porous block through which the fuel stream flows.

14. The method as recited in claim 11, including the step of flowing water adjacent the anode.

15. The method as recited in claim 10, including the step of separating the water from the fuel stream.

16. A method of deoxygenating a fuel stream comprising the steps of:

a) injecting electrochemically generated hydrogen into a fuel stream;

b) flowing the fuel stream across a catalyst downstream of the electrochemical device, wherein the catalyst promotes the formation of water utilizing the hydrogen gas generated by the electrochemical device and oxygen dissolved within the fuel stream.

17. The method as recited in claim 16, wherein an electrochemical device comprising a first electrode exposed to the fuel stream, a second electrode not exposed to the fuel stream and an electrolyte disposed therebetween to generate hydrogen for injection into the fuel stream.

18. The method as recited in claim 16 wherein the catalyst comprises a porous plug through which at least a portion of the fuel stream flows.

* * * * *